US012614328B2

(12) United States Patent
Liu et al.

(10) Patent No.: US 12,614,328 B2
(45) Date of Patent: Apr. 28, 2026

(54) SCREEN SHARING WITH MAPPED HOLOGRAPHIC PROJECTIONS

(71) Applicant: INTERNATIONAL BUSINESS MACHINES CORPORATION, Armonk, NY (US)

(72) Inventors: Su Liu, Austin, TX (US); Jeffrey Alan Schmidt, Rochester, MN (US); Syed I. Haiderzaidi, Round Rock, TX (US); Li Li, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 196 days.

(21) Appl. No.: 18/354,206

(22) Filed: Jul. 18, 2023

(65) Prior Publication Data

US 2025/0029302 A1 Jan. 23, 2025

(51) Int. Cl.
*G06T 13/00* (2011.01)
*G03H 1/00* (2006.01)
*G06F 3/01* (2006.01)
*G06T 7/246* (2017.01)
*G06V 40/20* (2022.01)

(52) U.S. Cl.
CPC .............. *G06T 13/00* (2013.01); *G03H 1/00* (2013.01); *G06F 3/011* (2013.01); *G06F 3/017* (2013.01); *G06T 7/248* (2017.01); *G06V 40/23* (2022.01); *G06T 2207/30196* (2013.01)

(58) Field of Classification Search
None
See application file for complete search history.

(56) References Cited

U.S. PATENT DOCUMENTS

| | | |
|---|---|---|
| 8,881,051 B2 | 11/2014 | Frey et al. |
| 8,937,591 B2 | 1/2015 | Julian et al. |
| 9,696,808 B2 | 7/2017 | Nishihara et al. |

(Continued)

FOREIGN PATENT DOCUMENTS

| | | | |
|---|---|---|---|
| EP | 2569673 A1 | 3/2013 | |
| WO | WO-2019180810 A1 * | 9/2019 | |
| WO | WO-2023276252 A1 * | 1/2023 | ........... A63F 13/213 |

OTHER PUBLICATIONS

Author: DVEtelepresence; Title: 3D Hologram Meetings? Unbelievable Real Telepresence, p. 10; Date: Feb. 27, 2010; Source: https://www.youtube.com/watch?v=jAIDXzv_fKA (Year: 2010).*

(Continued)

*Primary Examiner* — Jwalant Amin
(74) *Attorney, Agent, or Firm* — Tihon Poltavets

(57) ABSTRACT

A computer-implemented method, a computer system and a computer program product add a mapped holographic projection to a screen sharing session. The method includes transmitting a screen image from a presenter computing device to a participant computing device. The method also includes capturing a body movement image of the presenter using a camera. The method further includes identifying a gesture in the body movement image and mapping the gesture to the screen image. In addition, the method includes generating a holographic projection of a mapped gesture of the presenter. Lastly, the method includes displaying the holographic projection at the participant computing device in front of the screen image.

20 Claims, 2 Drawing Sheets

200

START

TRANSMITTING A SCREEN IMAGE FROM A PRESENTER DEVICE TO A PARTICIPANT DEVICE. 202

CAPTURE A BODY MOVEMENT IMAGE OF THE PRESENTER USING A CAMERA. 204

IDENTIFY A GESTURE IN THE BODY MOVEMENT IMAGE AND MAP THE GESTURE TO THE SCREEN IMAGE. 206

GENERATE A HOLOGRAPHIC PROJECTION OF THE MAPPED GESTURE OF THE PRESENTER. 208

DISPLAY THE HOLOGRAPHIC PROJECTION IN FRONT OF THE SCREEN IMAGE AT THE PARTICIPANT DEVICE. 210

END

(56) References Cited

U.S. PATENT DOCUMENTS

| | | | |
|---|---|---|---|
| 9,811,911 B2 | 11/2017 | Mason et al. | |
| 10,583,613 B2 | 3/2020 | Bharti et al. | |
| 10,628,635 B1 | 4/2020 | Carpenter, II et al. | |
| 10,838,574 B2 | 11/2020 | Agarawala | |
| 10,871,934 B2 | 12/2020 | Paulovich et al. | |
| 2009/0119604 A1 | 5/2009 | Simard et al. | |
| 2017/0003749 A1 | 1/2017 | Anglin et al. | |
| 2017/0277122 A1* | 9/2017 | Duffy ................... | G03H 1/0005 |
| 2018/0361680 A1 | 12/2018 | Bharti | |
| 2019/0091565 A1* | 3/2019 | Nelson ................ | G07F 17/3216 |

OTHER PUBLICATIONS

Bavor, "Project Starline: Feel like you're there, together", GOOGLE Research, https://blog.google/technology/research/project-starline/, May 18, 2001, 4 pgs.
Jackson, "IBM Files Patent for Hologram 3D Printer", Pioneering Minds, Source: 3D Printing Industry, [Accessed Jul. 14, 2023], 6 pgs., Retrieved from the Internet: <https://www.pioneeringminds.com/ibm-patent-hologram-3d-printer/>.

* cited by examiner

100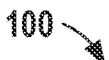

COMPUTER 101

PROCESSOR SET 110

| PROCESSING CIRCUITRY 120 | CACHE 121 |

COMMUNICATION FABRIC 111

VOLATILE MEMORY 112

PERSISTENT STORAGE 113

OPERATING SYSTEM 122

HOLOGRAM MAPPING
MODULE
150

PERIPHERAL DEVICE SET 114

| UI DEVICE SET 123 | STORAGE 124 | IoT SENSOR SET 125 |

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

| CLOUD ORCHESTRATION MODULE 141 | HOT PHYSICAL MACHINE SET 142 |
| VIRTUAL MACHINE SET 143 | CONTAINER SET 144 |

FIG. 1

SCREEN SHARING WITH MAPPED HOLOGRAPHIC PROJECTIONS

BACKGROUND

Embodiments relate generally to the field of holographic projection of human gestures, and more specifically, to adding a mapped holographic projection of presenter gestures to a screen sharing session.

In today's technology environment, online or virtual collaboration sessions that connect users through the Internet may be common. In such sessions, presenters and participants may use screen sharing features of an online meeting software application, which may allow a presenter on a computing device to share the display of all or part of a screen to remote participants, to enhance productivity and work from a common document. In this arrangement, the shared screen would appear as the same image to all participants, who may follow the presentation by referring to the image as the presenter gives the presentation and gestures to the image on the presenter's screen. The synchronization of the presenter's words and sounds with the shared screen image may enhance collaboration in the online or virtual session.

SUMMARY

An embodiment is directed to a computer-implemented method for adding a mapped holographic projection to a screen sharing session. The method may include transmitting a screen image from a presenter computing device to a participant computing device. The method may also include capturing a body movement image of the presenter using a camera. The method may further include identifying a gesture in the body movement image and mapping the gesture to the screen image. In addition, the method may include generating a holographic projection of a mapped gesture of the presenter. Lastly, the method may include displaying the holographic projection at the participant computing device in front of the screen image.

In another embodiment, the method may include obtaining session data from the presenter, wherein the session data is selected from a group consisting of: audio data, image data and text data. In this embodiment, the method may also include determining a context from the session data, wherein the context is associated with the gesture, and mapping the gesture to the screen image based on the context.

In a further embodiment, the gesture may be selected from a group consisting of: a hand movement, a head movement, and a gazing point.

In yet another embodiment, the displaying the holographic projection includes an indicator on the screen image at the participant computing device.

In still another embodiment, the method may include updating the holographic projection of the mapped gesture of the presenter based on a received indication about the holographic projection from the participant computing device.

In another embodiment, a machine learning model that predicts body movement of the presenter based on historical data associated with the presenter may be used to identify the gesture in the body movement image.

In yet another embodiment, the holographic projection may include the body movement image of the presenter.

In addition to a computer-implemented method, additional embodiments are directed to a computer system and a computer program product for adding a mapped holographic projection to a screen sharing session.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 1 depicts a block diagram of an example computer system in which various embodiments may be implemented.

DETAILED DESCRIPTION

Figure 2:
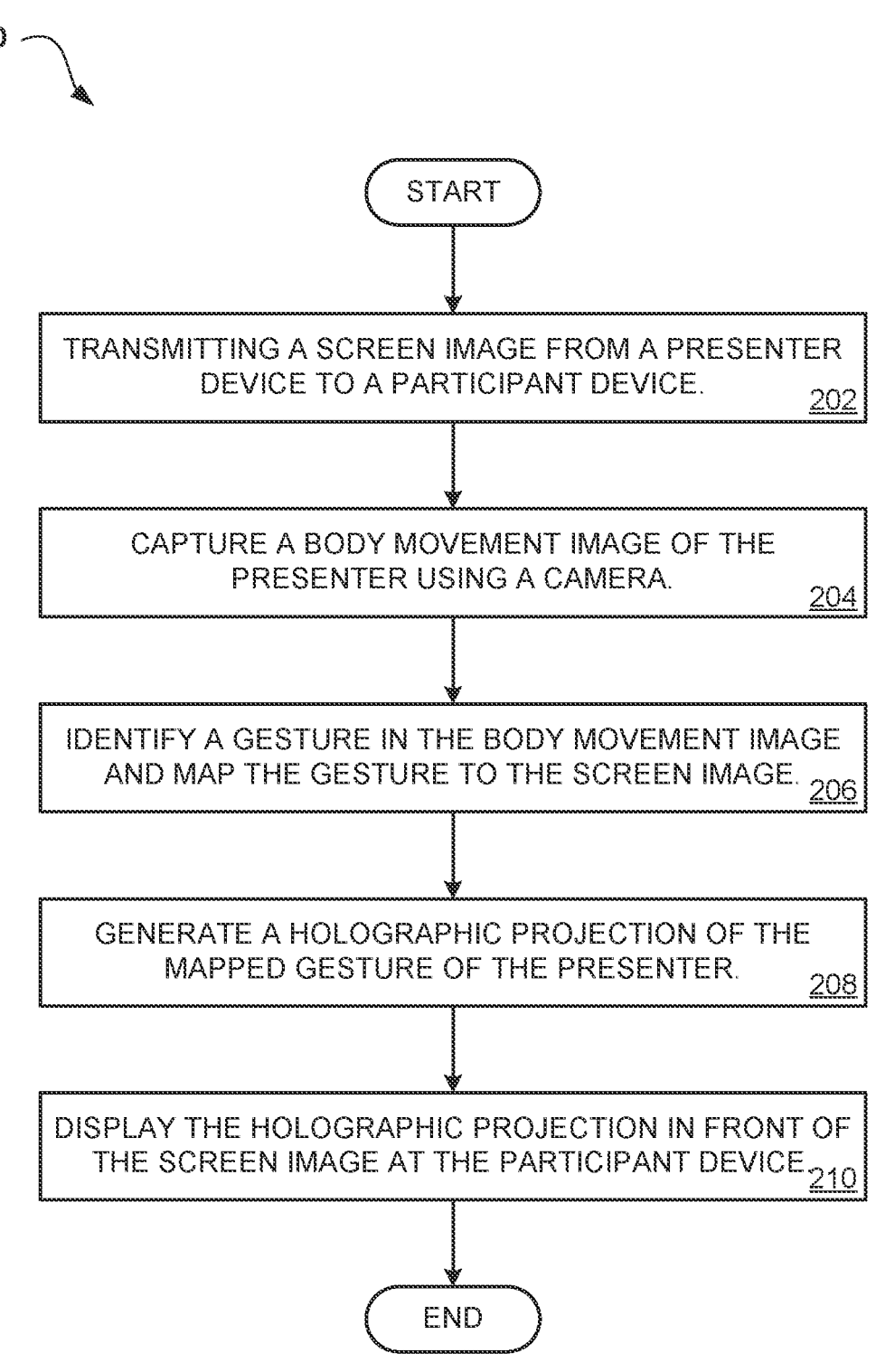
FIG. 2 depicts a flow chart diagram for a process that adds a mapped holographic projection to a screen sharing session according to an embodiment.

As remote work and global collaboration become more popular, the use of collaboration tools such as video conferencing applications or virtual meeting software may similarly become more prevalent. In many virtual conferences or meetings, a meeting host or presenter may share an image of a computer screen with the participants to enhance collaboration and allow participants to synchronize their understanding of the presentation with the content that may be transmitted in the session. In such sessions, this synchronization may be difficult because of the remote nature of the session. The body language and gestures of the presenter may be critical to understanding the presentation and this information may not easily be transmitted through a single image on a screen. For instance, the presenter may be referring generically to content within the image and possibly pointing at the shared image. In this scenario, the different spatial angles between the presenter and participants may make it impossible to synchronize the understanding with the presentation.

It may therefore be useful to provide a method or system to add a mapped holographic projection to a screen sharing session. Such a method or system may map the presenter's body language or gestures to a mapped holographic image that may be displayed at the participant computer device. The mapped holographic projection may further be mapped to the shared screen image and, as a result, the presenter's body language or gestures may be added to the experience of a participant in the session and enhance the synchronization of the presenter and participants in a screen sharing session. Such a method or system may increase the efficiency of screen sharing sessions and the effectiveness of virtual collaboration tools by using mapped holographic images to assist the audience in understanding the presenter in real time through mapping techniques.

Referring to FIG. 1, computing environment 100 contains an example of an environment for the execution of at least some of the computer code involved in performing the inventive methods, such as hologram mapping module 150. In addition to hologram mapping module 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and hologram mapping module 150, as identified above), peripheral device set 114 (including user interface (UI), device set 123, storage

124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/ or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in hologram mapping module 150 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in hologram mapping module 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of VCEs will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Computer environment 100 may be used to add a mapped holographic projection to a screen sharing session. In particular, hologram mapping module 150 may establish a screen sharing session, in which a screen image may be transmitted from a host or presenter device to a participant device. The module 150 may also capture an image of body movements, e.g., body language and gestures such as hand movements or head movements and including detection of gazing points and other physical attributes, using appropriate Internet of Things (IoT) devices in the presenter's location, including the presenter device that may be sharing the screen image in the session. The module 150 may then map the body movement data to the screen image by extracting a set of vectors for each identified gesture of the presenter in the physical environment and also determining relative positions of the vectors to the screen image. As an example, if the presenter points to the screen, vector information may be extracted for the finger or other pointing device of the presenter and a location on the screen may be determined for the gesture and mapped to a location on the image itself, such that a specific area of the image may be determined for the gesture and included in the information that may be sent to the participant computing device. At this point, the hologram mapping module 150 may generate a holographic projection of the presenter based on the body movement data that may be captured and according to the mapping information that may be determined with respect to the screen image being transmitted to the participant computing device. This hologram may be rendered as an overlay to the shared screen image or may be in the space in front of the screen of the participant computing device as appropriate and may also include an indicator on the shared screen image of a specific point on the image that the participant should focus on, if such a point were determined by the mapping to the screen image.

It should be noted that, while the body movement data may be specific to the presenter in determining any important information that should be transmitted to participants, it is not necessary for the hologram to personally identify the presenter. It is only required that the body movement data and the resulting hologram assist in the synchronization of the understanding of the participants to the information that a presenter may be sending in the screen sharing session and which may enhance the collaboration in the session.

Referring to FIG. 2, an operational flowchart illustrating a process 200 that adds a mapped holographic projection to a screen sharing session is depicted according to at least one embodiment. At 202, a screen sharing session may be established where a screen image may be transmitted from a presenter device to a participant device. The screen sharing session may be part of a virtual collaboration session or virtual meeting, where participants and hosts or presenters may be connected using an appropriate network connection and may use a virtual meeting application that allows for a common interface among devices and a "share screen" feature that may facilitate the transmission of the screen image. One of ordinary skill in the art would recognize that while it is required for the virtual meeting itself to have a single host computing device that the clients use for connection purposes, it is not required that the host and the presenter be the same person as both host or presenter computing devices and participant computing devices can share their screen with the virtual meeting. Any person connected to the virtual meeting may be a presenter or a participant. For the purposes herein, once a virtual meeting has begun and someone has shared their screen in the session, the remaining computing devices are considered participant computing devices.

At 204, an image containing body movement data of a presenter, e.g., body language or gestures, may be captured using an appropriate device. The camera on the presenter computing device may be used but one of ordinary skill in the art would recognize that this may not be the only possibility for capturing the image with the body movement data. Other examples of devices may include sensors or cameras, either in a fixed position or in a mobile device such as a smartphone, that may include a network connection such as Internet of Things (IoT) devices or other sensors.

It should be noted that all collection of body movement data from a presenter or any video, audio or text that may personally identify a presenter or any participant in a shared screen session or is sensitive in any other way requires the informed consent of all people whose information may be collected and analyzed by hologram mapping module 150. Consent may be obtained in real time or through a prior waiver or other process that informs a subject that their information may be captured by a device or other process and that the information may be used to add a mapped holographic projection to screen sharing sessions, as will be described in detail below. The information owner is free to decide at any time to revoke consent for use of sensitive information as these settings are permanently retained to keep complete control over their informed consent to use sensitive information in the process described herein. The consent described here may also refer to allowing some, or any, data relating to the information owner from being sent to a local server, cloud server or any other location. The owner has complete control on the transmission of information that may be sensitive or personally identify the owner of the information.

At 206, a specific gesture of a presenter may be identified in the body movement image and the specific gesture may be mapped to the screen image that is being shared in the session. Identifying specific gestures of a presenter may include obtaining and using information about past presentations or other interactions with the presenter such that specific gestures of the presenter may be recognized or even predicted. In addition, mapping the specific gesture to the screen image may include extracting a set of key vector data for a specific identified gesture and, in addition, determining a relative position in the screen image for the specific identified gesture. In the course of mapping a gesture to the screen image, the module 150 may obtain session data that may include further images or audio or text data from the screen sharing session and determine a context for the gesture. For instance, if the presenter were to make a statement such as "looking at this figure, certain inferences may be made," then the module 150 is not limited to the body movement image and may obtain the audio of the session, as well as any textual or other data that may be needed to determine the context or intent of the presenter. This context may allow the module 150 to map the gesture to the screen image more accurately improve the holographic projection described below.

In an embodiment, a supervised machine learning model may be trained to recognize a gesture of a presenter or even predict specific gestures of a presenter in a screen sharing session based on information that is already known about the presenter. One or more of the following machine learning algorithms may be used: logistic regression, naive Bayes, support vector machines, deep neural networks, random forest, decision tree, gradient-boosted tree, multilayer perceptron. In an embodiment, an ensemble machine learning technique may be employed that uses multiple machine learning algorithms together to assure better classification when compared with the classification of a single machine learning algorithm. In this embodiment, training data for the model may include past screen sharing sessions or presentations by the presenter or any other behavior that may be known about the presenter. The training data may be collected from a single presentation or from multiple interactions over a longer period of time. The results may be stored in a database so that the data is most current, and the output would always be up to date.

At 208, a holographic projection of the presenter may be generated at the participant device that mimics the gestures of the presenter. For instance, if the presenter indicates a particular area of the screen image and points a finger or pointing device to that area, then the holographic projection may include a representation of the presenter's hand or the pointing device over the screen image. As mentioned above, it is not necessary for the holographic projection to show a full image of the presenter or to personally identify the presenter. Because the goal is to synchronize the intent of the presenter with the understanding of participants, it is sufficient to add a holographic projection that marks a location or provides other information to assist in the participant's understanding of the context of the presenter. No limit to the manifestation of the holographic projection is intended.

At 210, the holographic projection may be displayed in front of the screen image at the participant computing device. Displaying the holographic projection may include an indicator of an exact position on the screen image such that the understanding of the participant at the remote end of the session may be synchronized with the presenter. It should be noted that the display of the holographic projection is not limited to a specific area that is directly in front of the screen image. It is only required that a holographic display occur at the participant computing device which is synchronized with the screen image such that the understanding of participants in the screen sharing session is enhanced.

Included at this step may be a feedback mechanism for enhancing the quality of the holographic projection as needed. For instance, if the holographic projection does not adequately indicate the context of the presenter's movements, a participant may indicate any issue to the hologram mapping module 150 directly or through the screen sharing session and the holographic projection may be modified to correct any deficiencies. The holographic projection may also be fully configurable by the presenter, through the consent described above with respect to sensitive or personally identifying information or any other method, to limit the holographic projection. One example of a limit to the display may be not allowing the face of the presenter to be rendered in the remote hologram, for instance.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:

transmitting a screen image from a presenter computing device to a participant computing device;

capturing, by a camera on the presenter computing device, a body movement image of a presenter;

identifying a gesture in the body movement image, wherein the gesture includes a finger of the presenter that points to an area on the screen image;

extracting vector information for the finger of the presenter that points to the area on the screen image;

determining a location on the screen image based on the vector information;

mapping the gesture to the location on the screen image on the presenter computing device;

generating a holographic projection of the mapped gesture of the presenter; and displaying, at the participant computing device, an overlay of the holographic projection on the screen image.

2. The method of claim 1, further comprising:

obtaining session data from the presenter, wherein the session data is selected from a group consisting of: audio data, image data and text data;

determining a context from the session data, wherein the context is associated with the gesture; and mapping the gesture to the screen image based on the context.

3. The method of claim 1, further comprising:

identifying another gesture in the body movement image, wherein the another gesture is selected from a group consisting of: a head movement and a hand movement.

4. The method of claim 1, wherein the displaying the holographic projection includes an indicator on the screen image at the participant computing device.

5. The method of claim 1, further comprising:

displaying the holographic projection of the mapped gesture of the presenter based on a received indication about the holographic projection from the participant computing device.

6. The method of claim 1, wherein a machine learning model that predicts body movement of the presenter based on historical data associated with the presenter is used in the identifying the gesture in the body movement image.

7. The method of claim 1, wherein the holographic projection includes the body movement image of the presenter.

8. A computer system comprising:

a processor set;

one or more computer readable storage media; and program instructions stored on the one or more computer readable storage media to cause the processor set to perform operations comprising:

transmitting a screen image from a presenter computing device to a participant computing device;

capturing, by a camera on the presenter computing device, a body movement image of a presenter;

identifying a gesture in the body movement image, wherein the gesture includes a finger of the presenter that points to an area on the screen image;

extracting vector information for the finger of the presenter that points to the area on the screen image;

determining a location on the screen image based on the vector information;

mapping the gesture to the screen image on the presenter computing device;

generating a holographic projection of the mapped gesture of the presenter; and displaying, at the participant computing device, an overlay of the holographic projection on the screen image.

9. The computer system of claim 8, wherein the operations further comprise:

obtaining session data from the presenter, wherein the session data is selected from a group consisting of: audio data, image data and text data;

determining a context from the session data, wherein the context is associated with the gesture; and mapping the gesture to the screen image based on the context.

10. The computer system of claim 8, wherein the operations further comprise:

identifying another gesture in the body movement image, wherein the another gesture is selected from a group consisting of: a head movement and a hand movement.

11. The computer system of claim 8, wherein the displaying the holographic projection includes an indicator on the screen image at the participant computing device.

12. The computer system of claim 8, wherein the operations further comprise:

displaying the holographic projection of the mapped gesture of the presenter based on a received indication about the holographic projection from the participant computing device.

13. The computer system of claim 8, wherein a machine learning model that predicts body movement of the presenter based on historical data associated with the presenter is used in the identifying the gesture in the body movement image.

14. The computer system of claim 8, wherein the holographic projection includes the body movement image of the presenter.

15. A computer program product comprising:

one or more computer readable storage media; and program instructions stored on the one or more computer readable storage media to perform operations comprising:

transmitting a screen image from a presenter computing device to a participant computing device;

capturing, by a camera on the presenter computing device, a body movement image of a presenter;

identifying a gesture in the body movement image, wherein the gesture includes a finger of the presenter that points to an area on the screen image;

extracting vector information for the finger of the presenter that points to the area on the screen image;

determining a location on the screen image based on the vector information;

mapping the gesture to the screen image on the presenter computing device;

generating a holographic projection of the mapped gesture of the presenter; and displaying, at the participant computing device, an overlay of the holographic projection on the screen image.

16. The computer program product of claim 15, wherein the operations further comprise:

obtaining session data from the presenter, wherein the session data is selected from a group consisting of: audio data, image data and text data;

determining a context from the session data, wherein the context is associated with the gesture; and mapping the gesture to the screen image based on the context.

17. The computer program product of claim 15, wherein the operations further comprise:

identifying another gesture in the body movement image, wherein the another gesture is selected from a group consisting of: a head movement and a hand movement.

18. The computer program product of claim 15, wherein the displaying the holographic projection includes an indicator on the screen image at the participant computing device.

19. The computer program product of claim 15, wherein the operations further comprise:

displaying the holographic projection of the mapped gesture of the presenter based on a received indication about the holographic projection from the participant computing device.

20. The computer program product of claim 15, wherein a machine learning model that predicts body movement of the presenter based on historical data associated with the presenter is used in the identifying the gesture in the body movement image.

* * * * *